United States Patent Office 2,707,706
Patented May 3, 1955

2,707,706

METHOD OF REDUCING CATALYST

Werner A. Bauch, Baton Rouge, La., assignor to Esso Research and Engineering Company, a corporation of Delaware No Drawing. Application December 6, 1949,
Serial No. 131,492

6 Claims. (Cl. 252—472)

The present invention relates to an improved process for the reduction of catalysts. The invention pertains more particularly to an improved method of reducing finely divided iron group catalysts suitable for synthesizing normally liquid hydrocarbons and oxygenated compounds from carbon monoxide and hydrogen in a fluid catalyst type of operation and to the hydrocarbon synthesis carried out in the presence of catalysts so reduced. In brief compass, the invention permits a considerable shortening of the time required for the reduction of such catalysts by reducing the catalysts in the presence of substantial amounts of previously reduced catalysts.

It is well known in the art to conduct hydrocarbon synthesis reactions by contacting hydrogen and oxides of carbon with catalysts of the iron group, particularly cobalt and iron under various temperature and pressure conditions. Small amounts of promoters are usually added such as oxides of magnesium and the rare earth metals for cobalt catalysts and oxides or salts of aluminum and alkali metals, particularly halides, carbonates and oxides of sodium and potassium for iron catalysts. These catalysts have been employed in fixed bed as well as in fluid catalyst operation. In the latter technique the catalyst usually comprises particles having particle sizes in the range of from about 5-200 microns and higher. These particles are maintained in a fluid ebullient state by means of up-flowing gases, the velocity of which is in the range from about 0.3-5 ft. per sec. or higher.

Temperature and pressure conditions depend largely on the catalyst used and the type of products desired. Temperatures of about 300-500° F. and pressures of 1-5 atmospheres abs. are most suitable for cobalt catalysts and the production of a predominantly saturated product. Iron catalysts require temperatures of about 500-800° F. and pressures of about 5-100 atmospheres to produce a predominantly unsaturated product rich in oxygenated compounds. Feed gas ratios of at least about 2 mols of $H_2$ per mol of CO are most suitable for cobalt catalyst while iron catalysts are mostly employed at ratios of less than 2 mols of $H_2$ per mol of CO.

The catalysts are normally prepared by reducing properly promoted natural or synthetic oxides or oxidic compounds of cobalt or iron in a stream of hydrogen or hydrogen containing reducing gas such as synthesis gas at temperatures of about 500-1200° F. at atmospheric or elevated pressures. This procedure has certain inherent disadvantages, the most important of which is the time and amount of hydrogen required for reduction. For example, a synthesis plant having an output of about 10,000 bbl. of oil per day requires a catalyst charge of about 200-500 tons. Several hundred hours of reduction time and many millions of cu. ft. of hydrogen per hour are needed for the reduction of such quantities of catalyst. Even in operations on a pilot plant scale having outputs of about 5-10 bbl. of oil per day about 500-2000 lbs. of catalyst must be reduced, which requires reduction times of 100-200 hours at fresh hydrogen feed rates of about 500-1500 standard cu. ft. per hour and about 5000 to 35,000 normal cu. ft. per hour of recycle gas in conventional operation. The present invention affords substantial improvements in this respect.

In accordance with the present invention, iron group synthesis catalyst, particularly iron catalyst itself is reduced with hydrogen-containing reducing gases in the presence of substantial amounts of previously reduced catalyst of the same type. The reduction is preferably carried out in fluid operation and with recycle of excess of hydrogen after removal of water in a manner known per se. In the case of iron catalysts reduction temperatures of about 500-800° F., pressures from about 15 to about 500 p. s. i. g. and total hydrogen throughputs of about 10 to 40 standard cu. ft. per hour per lb. of carbon and oxygen-free catalyst may be used. This total feed gas may contain about 0.2-5% of fresh hydrogen. The ratio of unreduced to previously reduced catalyst at the start of the reduction period should be about 0.5 to 5 lbs. of unreduced catalyst per lb. of previously reduced catalyst containing less than about 5% of reducible oxygen.

When so operating, it has been found that the time required for reducing the unreduced catalyst is only a fraction of that normally required, with the additional advantage of a correspondingly decreased fresh hydrogen requirement. In commercial operation the invention may be practiced, for example, by preparing originally a substantial excess of reduced catalyst, withholding this excess from synthesis operation and employing the amount of reduced catalyst so withheld in the reduction of all subsequent catalyst batches to be reduced.

The beneficial effects of the reduction process of the present invention will be further illustrated by comparative experimental data given in the following specific examples.

EXAMPLE I

An ammonia synthesis type of iron catalyst was prepared by the conventional method of fusing magnetite containing small amounts of alumina and potassia. The oxidic material had a composition about as follows (on a C and O-free basis)

| | Weight per cent |
|---|---|
| FeO | 31.2 |
| $Fe_2O_3$ | 65.2 |
| Free Fe | 0.1 |
| Total Fe | 69.9 |
| $Al_2O_3$ | 1.73 |
| $K_2O$ | 1.09 |
| $SiO_2$ | 0.12 |
| P | .002 |
| S | .004 |
| $Fe^{++}:Fe^{+++}$ ratio | 0.53 |

Five different batches of this material were successively placed in a fluid type hydrocarbon synthesis reactor of pilot plant size and reduced therein with about 600 standard cut. ft. per hour of make up hydrogen and about 20,000 standard cu. ft. per hour of dried recycle gas in five completely independent reduction stages at the conditions and with the results tabulated below.

Syela reduction rates and conditions on ammonia-type fluid catalysts

| Run No. | Temp., °F. | | Reactor Press., p. s. i. g. | Superficial Vel. @ Inlet, Ft./Sec. | Lbs. Cat. Reduced* (C and O Free) | Reduction Time, Hours | Percent O₂ on Cat. (C and O Free Basis) | | Reduction Rate, Lb. O₂ per Hr. |
|---|---|---|---|---|---|---|---|---|---|
| | Cat. Bed | Recycle Gas | | | | | Start | Finish | |
| 1 | 650 | --- | 345 | 1.25 | 916 | 157 | 34.0 | 14.4 | 1.14 |
| 2 | 650 | 42 | 350 | 1.15 | 518 | 127 | 34.7 | 9.3 | 1.04 |
| 3 | 725 | 45 | 260 | 1.12 | 410 | 116 | 35.4 | 4.4 | 1.10 |
| 4 | 742 | 45 | 350 | 1.20 | 894 | 134 | 35.0 | 2.0 | 2.20 |
| 5 | 735 | 38 | 295 | 1.37 | 417 | 103 | 35.8 | 3.2 | 1.32 |
| | | | | | | | | Avg.= | 1.36 |

*Average of carbon and oxygen free inventory at start and end of run.

EXAMPLE II

About 700 lbs. of the unreduced catalyst of Example I was added to the same reactor containing 763 lbs of the same type of catalyst which had been previously reduced at conditions similar to those of Example I for about 116 hours to an oxygen content of 4.2%. This catalyst mixture was reduced at the conditions and with the results tabulated below:

| Temp., °F. | | Reactor Press., p. s. i. g. | Superficial Vel. at Inlet, Ft./Sec. | Lbs. Cat. Reduced* (C and O Free) | Reduct. Time, Hours | Percent O₂ on Cat. (C and O Free Basis) | | Reduct. Rate, Lb. O₂/Hour |
|---|---|---|---|---|---|---|---|---|
| Cat. Bed | Recy. Gas | | | | | Start | Finish | |
| 732 | 47 | 355 | 1.40 | 519 | 53 | 35.4 | 2.2 | 3.24 |

*Average of carbon and oxygen free inventory at start and end of the run.

It will be seen from the above data that reduction in accordance with the present invention required only about ½ to ⅓ of the time required to reduce similar amounts of catalyst by the conventional procedure. The improvement in the reduction rate accomplished by the procedure of the invention amounts to almost 140%. The savings in hydrogen recycle requirements are approximately on the same percentage basis.

While reference has been made in the above description mostly to reduction in fluid operation it is noted that generally similar though considerably less pronounced benefits may be desired in fixed or moving bed operation, provided care is taken that the reduced and unreduced catalyst charges are intimately mixed during reduction. Iron catalysts of the ammonia synthesis type have been used in the above examples for purposes of illustration. However, the invention is not limited to these catalysts; it may be applied in a generally analogous manner to all other iron type catalysts as well as to nickel and cobalt catalysts as will be appreciated by those skilled in the art.

Numerous other modifications of the invention described herein may be made by those who are familiar with this art, without departing from the spirit of the invention.

What is claimed is:

1. The improved process of preparing an oxidic iron group catalyst for use in a hydrocarbon synthesis reaction which comprises adding to said catalyst in the initial oxidic form a substantial proportion of the same iron group catalyst previously reduced to contain less than about 5% of reducible oxygen, reducing the mixture with hydrogen at a rate such that the reduction period is about ½ to ⅓ of the time required to reduce similar amounts of oxidic iron group catalyst unmixed with previously reduced oxidic iron group catalyst.

2. The process of claim 1 in which said catalyst is an iron catalyst.

3. The process of claim 1 in which said catalyst and said previously reduced catalyst are maintained in the form of a dense turbulent mass of finely divided solids fluidized by an upwardly flowing gas.

4. The process of claim 3 in which said catalyst is an iron type catalyst and is reduced at a temperature of about 500 to 800° F. and a pressure of about 15 to 500 p. s. i. g. at a ratio of about 0.5 to 5 lbs. of unreduced catalyst per lb. of previously reduced catalyst.

5. The process of claim 1 in which said catalyst is reduced and thereafter contacted with H₂ and CO for said synthesis reaction while in the form of a dense turbulent mass of finely divided solids fluidized by an upwardly flowing gas.

6. The process according to claim 1 in which said admixture is at the ratio of about one lb. of previously reduced catalyst per 0.5 to 5 lbs. of unreduced catalyst.

References Cited in the file of this patent

UNITED STATES PATENTS

| | | |
|---|---|---|
| 2,139,602 | Raney | Dec. 6, 1938 |
| 2,164,292 | Jenness | June 27, 1939 |
| 2,360,787 | Murphree et al. | Oct. 17, 1944 |
| 2,451,879 | Scharmann | Oct. 19, 1948 |
| 2,472,501 | Sweetser | June 7, 1949 |
| 2,479,435 | Vesterdal | Aug. 16, 1949 |